(12) United States Patent
Dominiak et al.

(10) Patent No.: US 9,868,079 B2
(45) Date of Patent: Jan. 16, 2018

(54) METHOD AND SYSTEM FOR FILTRATION AND FILTRATION CAKE LAYER FORMATION

(75) Inventors: Dominik Marek Dominiak, Århus N (DK); Tom Bjerregaard Jæger, Viborg (DK)

(73) Assignee: Grudfos Holding A/S, Bjerringbro (DK)

(*) Notice: Subject to any disclaimer, the term of this patent is extended or adjusted under 35 U.S.C. 154(b) by 827 days.

(21) Appl. No.: 14/009,627

(22) PCT Filed: Mar. 27, 2012

(86) PCT No.: PCT/DK2012/050092
§ 371 (c)(1),
(2), (4) Date: Nov. 20, 2013

(87) PCT Pub. No.: WO2012/136213
PCT Pub. Date: Oct. 11, 2012

(65) Prior Publication Data
US 2014/0061126 A1 Mar. 6, 2014

(30) Foreign Application Priority Data
Apr. 5, 2011 (DK) .................................. 2011 70160

(51) Int. Cl.
*C02F 3/12* (2006.01)
*B01D 29/00* (2006.01)
(Continued)

(52) U.S. Cl.
CPC ..... *B01D 29/0002* (2013.01); *B01D 29/0075* (2013.01); *B01D 29/03* (2013.01);
(Continued)

(58) Field of Classification Search
CPC ........................................................ C02F 3/006
See application file for complete search history.

(56) References Cited

U.S. PATENT DOCUMENTS 3,715,191 A 2/1973 Rushton et al.
3,770,624 A 11/1973 McKibben et al.
(Continued)

FOREIGN PATENT DOCUMENTS

CN 1426379 A 6/2003
CN 1535170 A 10/2004
(Continued)

*Primary Examiner* — Peter Keyworth
(74) *Attorney, Agent, or Firm* — Knobbe, Martens, Olson & Bear, LLP

(57) ABSTRACT

The present invention relates to filtration of liquids, such as water, containing substances that desirably should be removed from the liquids. The invention relates in particular to a filtration cake, being produced in situ of a cleaning system from substances that desirably should be filtered away. Particular preferred embodiments of the present invention relate to treatment of waste water, where an activated sludge is provided, which sludge contains activated sludge flocs. These flocs are accumulated on a fluid penetrable support structure to form a layer of flocs, which subsequently is compressed to form a filter of desired properties. The invention also relates to adapting waste water—or other liquids containing biodegradable substances—to optimized biodegradation and filtration by deflocculating flocs in an activated sludge during or before a biodegradation step and subsequently promoting re-flocculation prior to filtering or other means of biomass separation.

11 Claims, 10 Drawing Sheets

(51) Int. Cl.
*C02F 3/00* (2006.01)
*B01D 29/03* (2006.01)
*B01D 29/64* (2006.01)
*B01D 29/82* (2006.01)

(52) U.S. Cl.
CPC ............ *B01D 29/64* (2013.01); *B01D 29/82* (2013.01); *C02F 3/006* (2013.01); *C02F 3/121* (2013.01); *C02F 3/1215* (2013.01); *C02F 2209/03* (2013.01); *C02F 2209/08* (2013.01); *C02F 2209/10* (2013.01); *C02F 2209/11* (2013.01); *C02F 2209/20* (2013.01); *C02F 2209/44* (2013.01); *Y02W 10/15* (2015.05)

(56) References Cited

U.S. PATENT DOCUMENTS

| | | | |
|---|---|---|---|
| 4,046,690 A | 9/1977 | Rodgers et al. | |
| 4,192,743 A * | 3/1980 | Bastgen | B01D 33/04 210/712 |
| 4,390,428 A | 6/1983 | Bratten et al. | |
| 4,528,103 A | 7/1985 | Spilkin et al. | |
| 4,539,097 A | 9/1985 | Kelterborn et al. | |
| 5,308,501 A * | 5/1994 | Eckert | C02F 9/00 205/755 |
| 6,505,744 B1 | 1/2003 | Geaugey et al. | |
| 6,517,723 B1 | 2/2003 | Daigger et al. | |
| 2002/0074287 A1* | 6/2002 | Park | C02F 3/302 210/605 |
| 2003/0042209 A1* | 3/2003 | Mori | B01D 21/01 210/723 |
| 2003/0121852 A1 | 7/2003 | Katsu et al. | |
| 2004/0188361 A1 | 9/2004 | Katsu et al. | |
| 2004/0238441 A1 | 12/2004 | Tanaka et al. | |
| 2005/0027021 A1 | 2/2005 | Espinoza et al. | |
| 2008/0087607 A1 | 4/2008 | Langlais et al. | |

FOREIGN PATENT DOCUMENTS

| | | |
|---|---|---|
| CN | 1541190 A | 10/2004 |
| CN | 1625428 A | 6/2005 |
| EP | 0220749 | 5/1987 |
| EP | 1270514 | 1/2003 |
| EP | 1873123 | 1/2008 |
| FR | 2775911 | 9/1999 |
| JP | 2002126469 | 5/2002 |
| JP | 2004167393 | 6/2004 |
| JP | 2004305807 | 11/2004 |
| WO | WO 2003/089103 | 10/2003 |

* cited by examiner

Operation mode

Cake formation:

Filtration:

METHOD AND SYSTEM FOR FILTRATION AND FILTRATION CAKE LAYER FORMATION

CROSS REFERENCE TO RELATED APPLICATIONS

This application is a U.S. National Phase Application of PCT International Application Number PCT/DK2012/050092, filed on Mar. 27, 2012, designating the United States of America and published in the English language, which is an International Application of and claims the benefit of priority to Danish Patent Application No. PA 2011 70160, filed on Apr. 5, 2011. The disclosures of the above-referenced applications are hereby expressly incorporated by reference in their entireties.

FIELD OF THE INVENTION

The present invention relates to filtration of liquids, such as water, containing substances that desirably should be removed from the liquids. The invention relates in particular to a filtration cake, being produced in situ of a cleaning system from substances that desirably should be filtered away.

Particular preferred embodiments of the present invention relate to treatment of waste water, where an activated sludge is provided, which sludge contains activated sludge flocs. These flocs are accumulated on a fluid penetrable support structure to form a layer of flocs, which subsequently is compressed to form a filter of desired properties.

In addition, the invention relates to adapting waste water—or other liquids containing biodegradable substances—to optimised biodegradation and filtration by deflocculating flocs in an activated sludge during or before a biodegradation step and subsequently promoting re-flocculation prior to filtering or other means of biomass separation.

BACKGROUND AND OBJECTS OF THE INVENTION

It is well known that filters in a waste water treatment process carried out in e.g. a Membrane Bio Reactor (MBR) suffer from the draw backs of fouling and clogging leading to limited and even no flow through the filters. Filtering is often provided by micro- or ultra-filtration comprising membranes having very high production costs, and at the same time quite fragile filter designs. The high production costs stipulate regeneration of the membrane, which is provided by back-flushing, chemical or enzymatic cleaning.

Recent developments (See e.g. Characteristics of a Self-Forming Dynamic Membrane Coupled with a Bioreactor for Municipal Waste water Treatment, Environ. Sci. Technol. 2002, 36, 5245-5251) suggest that the layer of biomass on a coarse mesh improves a solid-liquid separation. In the suggested method, the thickness of the biomass layer grows continuously during filtration. In order to control growth, bottom aeration is used to continuously lift some solids from the surface and the biomass layer and to keep the thickness more or less constant. Thickness of the fouling layer on the membrane depends on many factors: coarse bubble aeration rate, filter module geometry, sludge properties etc. so it is very hard to choose optimum conditions; in fact, the cake, or in general the biomass layer, forms more or less spontaneously, so its rejection capabilities are to a large extent undefined. Also, membrane coarse bubble aeration is one of the largest contributors to operating costs of an MBR, and membranes need chemical cleaning, which is both expensive and complicated.

An example of such a waste water treatment system is disclosed in JP 2004167393 which disclose a system in which a filter surface is exposed to gas bubbles by use of a diffuser arranged below a filter element to keep the filter element clean.

Hence, an improved means of achieving biomass retention in a waste water treatment process would be advantageous, and in particular a more efficient and/or reliable filtration operation mode would be advantageous.

It is also a known fact that biomass characteristics in typical MBR systems, and in particular the average particle size and particle size distribution, limit especially the filterability of biomass. Since these properties are uniform throughout the traditionally-built systems, they are never optimal for the different unit operations. Hence an additional aim of the present invention is to improve and optimize the waste water treatment process by adjusting the biomass flocculation state to the unit operations that the biomass is subjected to.

It is a further object of the present invention to provide an alternative to the prior art. In particular, it may be seen as an object of the present invention to provide devices, systems and methods that solve the above mentioned problems of the prior art with a new method for achieving membrane-quality filtration with compressed biomass, and a method to adjust biomass particle size distribution so that it is optimal for each unit operation in a waste water treatment process.

SUMMARY OF THE INVENTION

Thus, the above described object and several other objects are intended to be obtained by the various aspects of the invention which in a first aspect relates to a method for providing a filtration cake of a filter element, preferably being a filtration cake used in the system according to the other aspect of the present invention. The filtration cake is provided by:

an accumulation phase (A) comprising accumulating activated sludge flocs on a support structure by inducing a pressure difference to generate a flow of sludge towards and through the support structure until a layer of flocs has been established on the support structure, a compression phase (B) comprising increasing the pressure difference to a level being sufficient to compress the layer of accumulated flocs on the support structure into a filtration cake of desired properties.

Thereby filtering may be provided at a very low cost and with easy disposal while still providing a filtration at least comparable to ordinary micro- or ultrafiltration.

By desired properties of the filtration cake is preferably meant a filtration cake being able to produce filtrate of quality normally found in membrane bioreactors employing microfiltration or ultrafiltration membranes.

An advantage of the invention is that the majority of resistance to flow comes from the filtration cake and not the filter support, and that all the selectivity of the filter comes from the filtration cake.

A general concept that has been implemented in many embodiments of the present invention is to filter activated sludge and/or activated sludge supernatant instead of what is done in all existing systems, namely filtering mixed liquor. Activated sludge supernatant is the water that the suspended solids (bacteria) are suspended in. The concept assumes settling the solids or using e.g. centrifugal action in order to separate the solids from the liquid they were suspended in, and then filtering the activated sludge supernatant through the filtration cake. This way, the filtration cake will not grow—or at least grow less—and the filtration cake will fulfil its function of removing very small particles that are unwanted in the effluent from the reactor.

In the present context, a number of terms are used in a manner being ordinary to the skilled person. However, some of these terms are explained below:

Flocs, fluccuation and deflocculation is preferably used to mean the following:
  Flocs: microbial aggregates forming majority of mixed liquor suspended solids
  Flocculation: process of aggregation of microorganisms into activated sludge flocs
  Deflocculation: process of disintegration of activated sludge flocs into fragments and/or primary particles (e.g. single cells)

Activated sludge is preferably used to mean a mixture of liquid, typically being water, and mass of biological flocs, made up by bacteria, protozoa and other particles held together (like glue) by extracellular polymeric substances produced by bacteria. The mixture of flocs and liquid are in general called activated sludge and often called mixed liquor as well.

Activated sludge flocs is preferably used to mean biological flocs of an activated sludge.

Activated sludge supernatant is preferably used to mean the water phase resulting from settling, centrifugation or in general separation of activated sludge, by separating out e.g. flocs and/or other solid elements contained in the sludge before the sludge supernatant is displaced through the filtration cake 10.

According to preferred embodiment, the method may further comprise determining, by measuring and/or calculating one or more parameters, such as turbidity, suspended solids concentration, total bacteria count, total organic carbon concentration, chemical oxygen demand (COD) of the fluid after having passed through the support structure during the accumulation phase and the compression phase when a pre-defined criteria involving a measured and/or calculated parameter has been met.

Preferably, the pressure difference during the accumulation phase is below 1 bar, such as below 0.5 bar, or even lower than 0.1 bar, and the pressure difference during the compression phase is above the pressure difference of the accumulation phase and below 2 bar, such as below 1 bar, or even below 0.3 bar.

The pressure difference during the accumulation phase (A) may preferably be constant over time or increased over time.

Preferably, the pressure difference during the accumulation phase and/or the compression phase is/are provided by a hydrostatic pressure difference, e.g. provided by arranging an outlet of the filter element at lower level than an upper surface of the sludge, by pressurising the sludge, and/or providing a suction at the outlet.

In preferred embodiments, the pressure difference during the accumulation phase and/or the pressure difference during the compression phase is/are provided by pumping means, such as by a pump arranged in or downstream of the outlet of the filter element.

In preferred embodiments, the support structure may preferably be cylindrically shaped, and the method may preferably comprise feeding sludge to the support structure and rotating the support structure to provide centrifugal forces forcing flocs in the sludge towards the support structure.

Preferably, the accumulation phase and the compression phase may comprise rotating the support structure at two different rotational speeds, the rotational speed during the compression phase being higher than the rotation speed during the accumulation phase.

The surface of the filtration cake may preferably be trimmed by mechanical manipulation, such as by scraping the surface of the filtration cake.

The filtration cake may advantageously and preferably be provided solely by flocs present in the activated sludge. Alternatively or in combination thereto, the filtration cake may be provided by flocs present in the activated sludge and coagulated substances provided by adding a coagulant to the sludge.

Preferred embodiments of the invention may further comprise a backing layer on the support structure so that the filtration cake forms on the surface of the backing layer. The backing layer may preferably be either fixed or disposable.

The filter may preferably after having been in an operation mode for a period, be renewed preferably by removing the filtration cake by scraping or other means of cleaning, and the accumulation phase and compression phase are preferably carried out again.

In a second aspect, the invention preferably relates to a filtration system comprising a filter element, the filtration system being adapted to displace water of an activated sludge or activated sludge supernatant through the filter element by means of pressure difference across the filter element. The filter element further comprising a water outlet for discharging water from the filtration system, wherein
  the filter element is provided with a filtration cake provided on a fluid penetrable support structure of the filter element; the support structure having one or more surfaces facing the activated sludge or supernatant and comprising compressed activated sludge flocs, and
  the filtration cake being compressed in a filtration cake design phase (A, B) prior to filtration of the activated sludge or supernatant.

The support structure may preferably be defined by a material having penetrations, such as a net with meshes, wherein the pore diameter of the penetrations is preferably in the range of 1 micron to 100 micron. Alternatively or in combination thereto, the support structure may be a net made from metal, such as stainless steel. Preferably, the filter element or a backing layer is adapted to be replaced. According to preferred embodiments of the invention, a number of filter elements may be arranged in the system.

A source of gas, said gas being preferably atmospheric air or oxygen, may preferably be provided for generating a flow of gas bubble across the face of the filtration cake facing towards the activated sludge or activated sludge supernatant and assisting in removal of flocs and/or other solids elements deposited on the surface of the filtration cake and/or wherein a scraping or other means are performed to remove deposits.

Systems according to preferred embodiments of the invention may further comprises means for separating out flocs and/or other solid elements contained in the sludge before the activated sludge supernatant is displaced through the filtration cake. The means of separation of flocs and/or other solid elements may preferably comprise centrifugal or other gravitational separation or settling means.

In some preferred embodiments, the filtration cake is formed on a backing layer on the support structure. The backing layer preferably comprises paper, a net or similar, having pore sizes allowing filtrate to pass through while allowing build-up of the filtration cake.

Preferably, the filter after having been in an operation mode for a period, may be renewed by removing the filtration cake by scraping or other means of cleaning, and the filtration cake design phase may preferably be carried out again.

In a third aspect, the invention relates to a method of filtering an activated sludge or activated sludge supernatant, the method utilises a filtration system according to the first aspect of the invention and comprising:
- providing a filtration cake preferably by a method according to the first aspect of the invention
- filtering activated sludge or supernatant through the filtration cake
- removing the filtration cake.

Preferably, no sludge or activated sludge supernatant is expelled to external environment during providing and removing of filtration cake. The sludge flowing through the filter element during providing and removing the filtration cake may preferably be recirculated to the filtration system.

Typically and preferably, the filtration cake, once it looses its filtration performance, may be expelled from the system as surplus activated sludge.

In a fourth aspect, the invention relates to a method of treating an activated sludge, the method comprising:
- aerating the activated sludge, by introducing gas, such as atmospheric air or oxygen into the activated sludge,
- filtering the activated sludge or the activated sludge supernatant thereof by use of a filtration system according to the first aspect of the invention.

Preferably, the gas is introduced as molecular oxygen, bubbles or combinations thereof.

In a fifth aspect, the invention relates to a method of treating waste water or other liquids containing biodegradable substances, the method comprising the steps of:
- deflocculating flocs in an activated sludge prior to and/or during a biodegradation step
- promoting, such as allowing, re-flocculation of the de-flocculated flocs, and
- separating the flocs from the treated water prior to a filtration of activated sludge supernatant.
- filtration of the activated sludge supernatant.

The defloccuation of flocs may preferably be carried out by imposing hydraulic shear forces to the activated sludge, e.g. by the fluid flowing through a centrifugal pump, by agitating the sludge e.g. by a stirrer, feeding sludge through a nozzle or combinations thereof, or by chemical means.

Promotion of the re-flocculation of the de-flocculated flocs may preferably be provided by a retention time period, preferably comprising passing the sludge through a retention chamber in which the sludge is contained during flocculation, during which shear forces, if any, in the sludge do not produce a deflocculation and promotion of aerobic microbial activity is assured.

In preferred embodiments, the promotion of the re-flocccution comprising or may further comprise aeration, addition of substrate (waste water or external substrate) and/or chemical flocculant dosing.

Filtering may preferably be provided by feeding activated sludge through a filter by means of pressure gradient across the filter, and the filter may preferably be a filtration cake provided according to first aspect of the present invention.

The various steps involved in the invention, may preferably be executed as consecutive steps. However, it is often preferred to execute the deflocculation and biodegradation steps simultaneously by introducing e.g. the deflocculation in a reactor, such as a chamber, in which the biodegradation is carried out.

An advantage of the deflocculation and reflocculation is that it is applicable not only in MBR contexts, but also in other contexts such as Conventional Activated Sludge Process (CASP), which relies on settling rather than filtration, or in general to any waste water treatment process applying activated sludge. Since the same properties of sludge are desired in filtration and settling (as high a level of flocculation as possible) this invention can be applied in broad contexts and possibly retrofitted to existing conventional activated sludge plants.

By the average particle size drop during deflocculation, it has been found that the biodegradation is greatly improved. In addition separation as well as filtration is rendered easier after reflocculation, when the average particle size is higher and particle size distribution is narrower.

Further embodiments of the invention are presented in the below disclosure as well as in the claims.

The various aspects of the present invention may each be combined with any of the other aspects. These and other aspects of the invention will be apparent from and elucidated with reference to the embodiments described hereinafter.

BRIEF DESCRIPTION OF THE FIGURES

The invention and in particular preferred embodiments thereof will now be described in more detail with regard to the accompanying figures. The FIGS. show ways of implementing the present invention and are not to be construed as being limiting to other possible embodiments falling within the scope of the attached claim set.

DETAILED DESCRIPTION OF EMBODIMENTS

Figure 1:
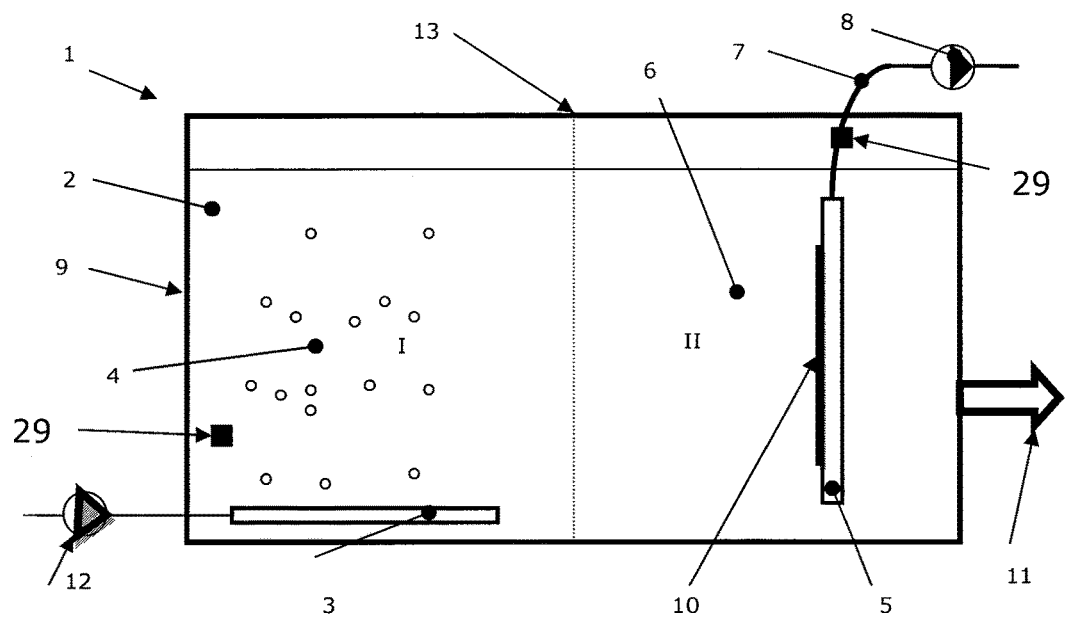
FIG. 1 shows in a schematically manner an implementation according to the present invention.

With reference to FIG. 1 an implementation of the present invention will now be disclosed. It is noted that the implementations disclosed herein relate to examples on the invention and are not to be construed as limiting the scope of the invention.

FIG. 1 discloses in a schematically manner a waste water treatment system 1. The system 1 comprises a compartment 9 comprising activated sludge 2. In the compartment 9, an aeration device 3, being adapted to produce and introduce air bubbles 4—or in general oxygen or air—into the sludge 2, is arranged at the bottom of the compartment 9.

A number of filter elements 5 may be arranged submerged in the liquid inside the compartment 2 in zone I in the region of an outlet 11 for out letting liquid, such as surplus of activated sludge, from the compartment 9. The location of the outlet 11 can be different from what is disclosed in FIG. 1. In the embodiment of FIG. 1 only one filter element 5 is arranged in compartment 2.

Figure 2:
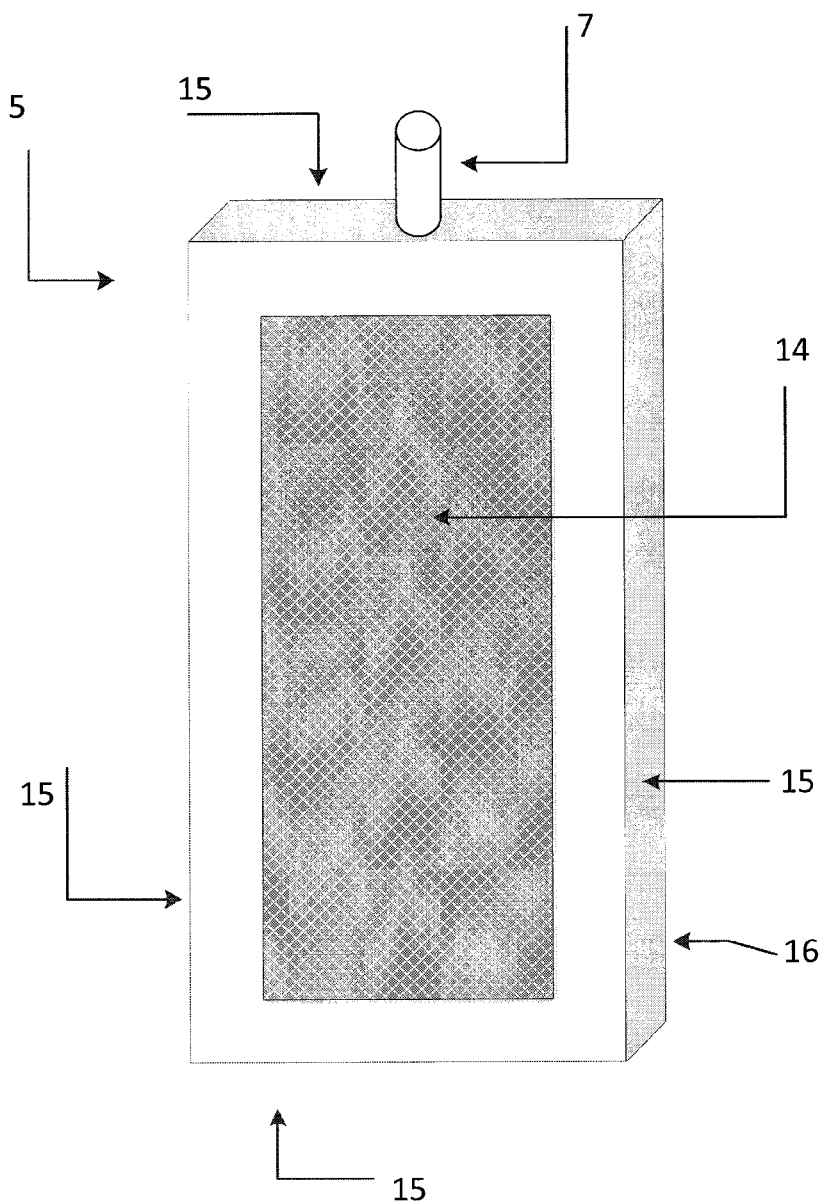
FIG. 2 shows schematically a filter element with a support structure according to the present invention.

With reference to FIG. 2, each of the filter elements 5 has a support structure 14 forming part of one surface of the element 5 and being defined by a net so as to establish a fluid penetratable surface. The surface 16 opposite to the support structure 14 and the surfaces 15 are not fluid penetratable, although this could be an option within the present invention. The support structure 14 may comprise one or more surface facing the activated sludge or activated sludge supernatant and/or forming one or more surfaces of the element 5. For instance the filter element may be tubular-shaped or hexagonally shaped with support structure forming part of one or more surfaces thereof. The filter element comprises a connection forming an outlet 7 connected to the pump 8 (FIG. 2). The only fluid openings of the filter elements 5 are accordingly, the support structure 14 and the outlet 7 and the filter elements 5 thereby defines internal cavity.

One aim of the invention is to remove biodegradable substances contained in waste water. In many of the preferred embodiments, this is implemented by waste water being put into a process tank of a waste water treatment facility. In this tank there are bacteria, which inhabit the process tank (compartment 9 of FIG. 1) and remain there all the time. These bacteria form aggregates called flocs. These flocs are in general called activated sludge, often called mixed liquor as well. Accordingly, the liquid in the process tank is often termed activated sludge or mixed liquor, because it contains the bacterial flocs. If sludge is allowed to settle, the flocs will settle to the bottom of a container and two phases are produced—thickened sludge (still referred to as activated sludge) and activated sludge supernatant, which is the water phase on top of the sediment. Activated sludge supernatant contains treated water (in which bacteria have already biodegraded the contaminants) and some small particles in the suspended and colloidal range, as well as some macromolecules. This is what is aimed at to remove with the filtering according to the present invention by filtering element 5 of FIG. 1. A centrifugation or settling may be introduced to make sure—at least to some extent—that filtering is carried out of the activated sludge supernatant without flocs, which otherwise could cause the cake to grow more than acceptable.

With reference to FIG. 1 waste water is supplied to the compartment 9 by suitable pumping means (not shown). Bacteria are present in the compartment 9 and when the biologically degradeable material in the waste water gets in contact with the bacteria, a biodegradation takes place. To effectuate the aerobic biodegradation, air bubbles comprising either oxygen or atmospheric air may be introduced from a position close to the bottom of the compartment 9 by the aeration device 3. Air is fed into the aeration device 3 by a pump 12. Besides aerating the liquid above the aeration device 3, the introduction of air bubbles may induce a mixing flow.

Assuming that a filtration cake 10 (which will be described in detail later), comprising accumulated and compressed activated sludge flocs present in the sludge 2, has already been formed on the net 14 on the support structure 5, filtering of the liquid may be provided when the pump 8 provides a flow of liquid through the filter element 5. The filtering is provided by the pores of the filtration cake 10 (formed on the support structure 14) having sufficient porosity to let liquid, in the preferred embodiment being water, pass through but preventing activated sludge flocs and other particles from the activated sludge supernatant to pass through the filtration cake 10.

The filtering may generate a build-up of flocs of biological material on the filtration cake 10. To prevent such build-up, air bubbles may be introduced from a position below the support filter elements 5 by means of an aeration device (not shown) similar to the aeration device 3. Air typically being atmospheric air or in general gas is fed to the aeration device by means of the pump. The air bubbles introduced by the aeration device will rise up along the filtration cake 10 and during this rise, their interaction with the liquid and the activated sludge flocs tends to limit or even avoid build-up of the flocs of activated sludge on the filtration cake 10, made of accumulated and compressed flocs of activated sludge.

As indicated in FIG. 1 the process is preferably controlled so that two zones I and II are established in the compartment 9 as indicated by the dotted line 13. The dotted line does not indicate a physical division of the compartment but serves merely to indicate that an aim may be to establish two zones I and II. In addition, the interface between the two zones is in practise not sharp. In zone I, the components of waste water are degraded by bacteria that make activated sludge and in zone II the activated sludge or activated sludge supernatant is filtered, so activated sludge flocs remain in compartment 9 and a filtrate is provided by the filter element 5. Thus, the flow pattern and the residence time inside the compartment 9 are controlled so that the sludge has performed biodegradation and has been flocculated before the sludge comes into the region of the filter 6.

The system comprises a number of sensors used for monitoring and controlling the treatment process. The actual locations of these sensors are selected according to what is to be monitored in a manner being ordinary to a skilled person. In FIG. 1 pressure sensors 29 are shown in an exemplary manner and their locations may vary.

The system also comprises a control unit (not shown) comprising a processing unit and memory, typically embodied as a computer. The control unit has instructions being executed to control the system, e.g. the various pump and valves of the system inter alia in response to signals received from the sensors.

The temperature of the sludge in the compartment 9 should in many cases be within certain ranges to obtain optimal conditions for the degradation. Accordingly, one or more temperature sensors are arranged inside the compartment 9. If a sensor detects that the temperature of the sludge is to low, heat may be added by suitable means either by heating waste water being added to the compartment 9 and/or by heating the liquid present in the compartment. Similar measures may be applied in case the temperature gets too high.

The quality of the liquid leaving the filter elements 5 through outlet 7, the filtrate, can be determined in different manners. Typically, the turbidity is considered when the quality of the filtrate is to be monitored and a turbidity sensor is arranged in the outlet 7. Another parameter to monitor could be total organic carbon concentration (TOC), total bacteria count, suspended solids concentration (SS) or chemical oxygen demand (COD).

An oxygen sensor is typically arranged inside the compartment to determine the oxygen content in the activated sludge. If the oxygen content is not within the ranges preferred, the aeration device introduces more or less oxygen in response to oxygen content being not with ranges preferred by suitable operation of the pump 12.

One or more pressure sensors are applied to determine the pressure difference across the support structure 14 and the filtration cake 10. It has been found that the pressure difference across the support structure 14 and the filtration cake 10 should be below 1 bar and in the embodiments shown in FIG. 1, the pressure difference is set by the pump 8 as a constant water column height in the compartment 9 is assumed or the addition of e.g. waste water and the outlet of liquid through 11 are controlled to achieve this.

The outputs from the various sensors are fed into a controlling device, typically being a computer having instructions for controlling the various pumps, valves, heating means, cooling means etc. arranged in the system 1. While many of the controlling instructions may be determined theoretically, it has been found more practical to base the controlling on experiments.

As noted above, the support structure 14 is formed from a net having a mesh size being sufficient to prevent particles of a certain size to pass through. The mesh size is preferably in the order of 1-100 micron times 1-100 micron and the net is preferably made as a woven or non-woven fabric produced from paper, synthetic or natural fibers or metal, such as stainless steel mesh.

A backing layer may be applied on support structure 14, and the filtration cake 10 will be formed on this backing layer. Such backing layer may be paper, fabric, net or similar and in such cases, the support structure 14 is typically adapted to support the backing layer and the filtration cake 10 and being provided with openings being insufficient to arrest flocs. The arrestment of activated sludge flocs is instead carried out by the backing layer. Combination of these different measures to arrest activated sludge flocs may be used.

A filtration cake design phase (filter cake build up phase), for providing the filtration cake 10, is initiated upon start-up of the system or in general when no filtration cake 10 is present on the support structure 14. The filtration cake design phase comprising, with reference to FIG. 3A, the accumulation phase A from time $t_1$ to $t_2$ and the compression phase B from time $t_2$ to $t_3$. During phase A, the pressure difference is relatively low, that is typically in the order of 0.01 to 0.1 bar and activated sludge flows towards the support structure 14. At the very beginning of the filtration cake design phase, activated sludge flocs and other particles having a size being too large to go through the openings in the support structure 14 or the backing layer are arrested by the support structure 14 or backing layer and stick to the mesh.

During the accumulation phase A at least, activated sludge flocs having a size allowing them to pass through the mesh or the not yet fully designed filtration cake 10 go through the filter element 5 and in order to avoid discharging these flocs to the environment, the fluid going through the filter element 5 is typically recycled to the compartment 9.

Figure 3A:
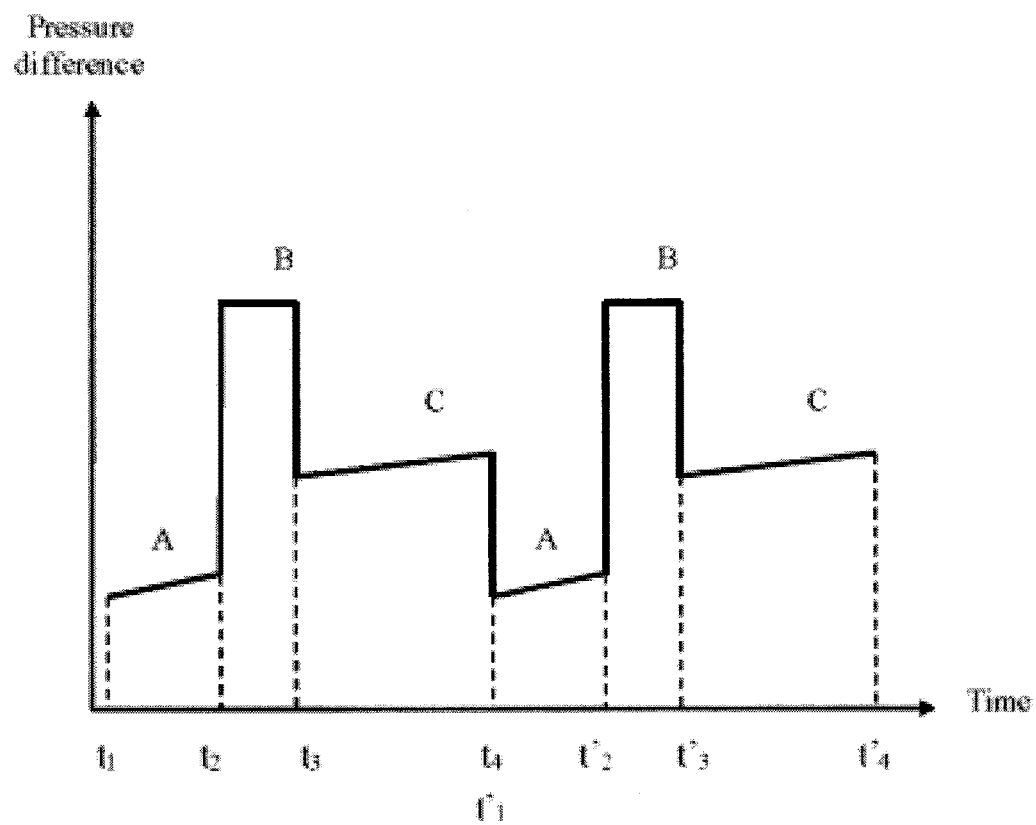
FIG. 3A is a chart indicating an imposed pressure difference profile over the filter element 5 during a filtration cake design phase (A, B) and filtration phases (C) of the system which filtration cake design phase (A, B) typically takes place in the beginning of each filtration cycle and which phases typically constitutes a filtration cycle.

Once flocs have begun to be arrested on the support structure 14 or the backing layer and activated sludge flows towards the support structure 14 a further accumulation of flocs on the support structure occurs. This further accumulation is continued until a pre-determined thickness of accumulated activated sludge flocs has been reached ($t=t_2$). The point in time at which this occurs may be determined in a number of ways. One possible way is to monitor the pressure drop over the filter element 5 and experimentally determine a correlation between the filtration cake of accumulated activated sludge flocs and the pressure drop, so that phase A is ended once a certain pressure drop occurs over the filter element 5. In FIG. 3A, this is indicated by the pressure curve in phase A being sloped.

At the end of phase A ($t=t_2$), the filtration cake 10 has been formed, but is still mechanically quite unstable and the filtering characteristics of the filtration cake 10 may still not be as desired. During compression phase B (from $t_2$ to $t_3$), the pressure difference over the filter element is at an elevated level providing a compression of the filtration cake 10. The pressure difference needed for this compression may vary, but may typically be in the range of 0.01 to 1 bar measured across the support and the filtration cake 10. The compression is carried out for a certain time, preferably being determined experimentally, with the aim of compressing flocs in the entire filtration cake 10. At the end of phase B ($t=t_3$), the filtration cake 10 comprising accumulated and compressed activated sludge flocs and the filter element 5 is ready for filtration and filtration phase C ($t>t_3$) is initiated. Once phase B is ended, the pressure difference is lowered to a pressure difference typically being smaller than 1 bar, recirculation of filtrate, if implemented, is stopped, and the filtration as disclosed above is carried out, provided that the filtrate quality is sufficient.

It should be noted, that design of the filtration cake 10 can be performed with other pressure profiles than what is disclosed in FIG. 3A. For instance the step wise increase and decrease of pressure difference disclosed in FIG. 3A may be replaced by smooth pressure transitions and a repetition of phase A and B may also be applied even with different levels of pressure differences in the consecutive phases A and B. When such measures are applied, a further control of the filter characteristics may be applied. For instance, by having a very short consecutive phase B with a relatively high pressure difference, the innermost part of the filtration cake 10 would get relatively more compressed than if the pressure difference was lower.

During filtration, that is in phase C with reference to FIG. 3A, flocs may accumulate on the surface of filtration cake 10. Such accumulation is often undesired and means can be applied to remove such accumulated activated sludge flocs, e.g. by mechanically scraping off the flocs and/or feeding air bubbles past the surface of the filtration cake 10. However, it has been found that the filtration cake 10 may be exposed to fouling. If—or when—such fouling blocks the filter 5, the filtration cake is replaced. Small particles from the activated sludge supernatant accumulate inside the filtration cake 10 and this mechanism is responsible for increasing the quality of the filtrate. It is noted that accumulation of flocs may have the same benefit.

Replacement—or in general renewal—of the filter or filter cake 10 is performed at $t=t_4$ from which a new design phase is initiated after removal of the filtration cake 10. Thus, at $t=t_4$ the cycle comprising phases A, B and C is repeated as indicated in the figure. Phase A and B are in the time range of seconds, preferably phase A being around 20 seconds and phase B being around 15 seconds, whereas phase C is in the range of 300 seconds.

It is noted that FIG. 3A does not disclose the time needed for and the pressure during replacement (renewal) of the filter or filter cake 10. In practical implementations $t_1$ is not coinciding with $t_4$ as indicated in FIG. 3A as $t_1'$ is a point in time occurring after $t_4$. However for the sake of clarity, the pressure difference over the filter element 5 is not disclosed. The actual evolution of the pressure difference over filter element 5 during replacement or renewal depends of the processes involved, but in many cases where e.g. scraping off of the filtration cake 10 being a part of the renewal process, the pressure difference is often fluctuating. Furthermore, it may be preferred to make the pressure difference equal to zero during such processes.

Figure 3B:
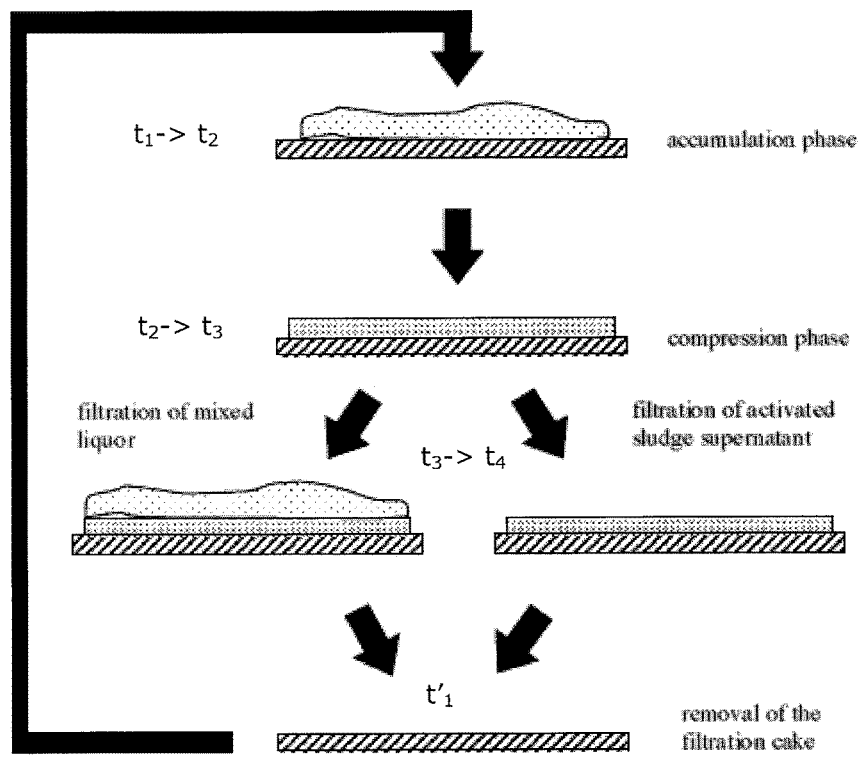
FIG. 3B shows in a schematical flow chart, cycles of accumulation phases, compression phases, filtration phases and removal of filtration cake.

FIG. 3B shows in a schematically flow chart, cycles of accumulation phases, compression phases, filtration phases and removal of filtration cake. Please note, that the figure shows two alternatives in the same flow chart namely, filtration of mixed liquor and filtration of activated sludge supernatant. The time instants shown in FIG. 3A are also disclosed in 3B.

Compared to conventional filtering using e.g. polymeric or ceramic filters, the present invention provides an advantage with respect to regeneration and adjustment of filter capabilities, such as improved rejection capabilities of the cake due to porosity adjusted by pressure treatment in stage B. In the present invention, the regeneration of the filter capabilities is provided by removing the filtration cake 10 and establishing a new filtration cake 10 by the methods disclosed above. As the filter material, that is the filtration cake 10, according to the present invention is made from the very same material as what is to be filtered away from the sludge the filter may be disposed in the same manner as the filtered away material. Furthermore, the cost for the filter material can be neglected.

Removal of the filtration cake 10 may be provided e.g. by mechanical actions such as scraping or a chemical action. The mechanical action is preferred, although some material may be left on or in the support structure 14. However, the support structure 14 is preferably made from stainless steel or other heat or chemical-resistant material, and any leftovers may be burned away, removed by chemical cleaning and/or removed mechanically.

In embodiments, where a backing layer is applied, the backing layer is typically removed together with the filtration cake 10 with the result that no material is left on or in the support structure 14.

While the replacement of the filtration cake 10 is disclosed above to impose at least to some extend a replacement phase where no filtration occurs, the system may be adapted to provide a continuous filtering. This may be provided e.g. by having a number of filter elements 5 and replacing one or more—but not all—filter elements 5 in a sequence.

Figure 4:
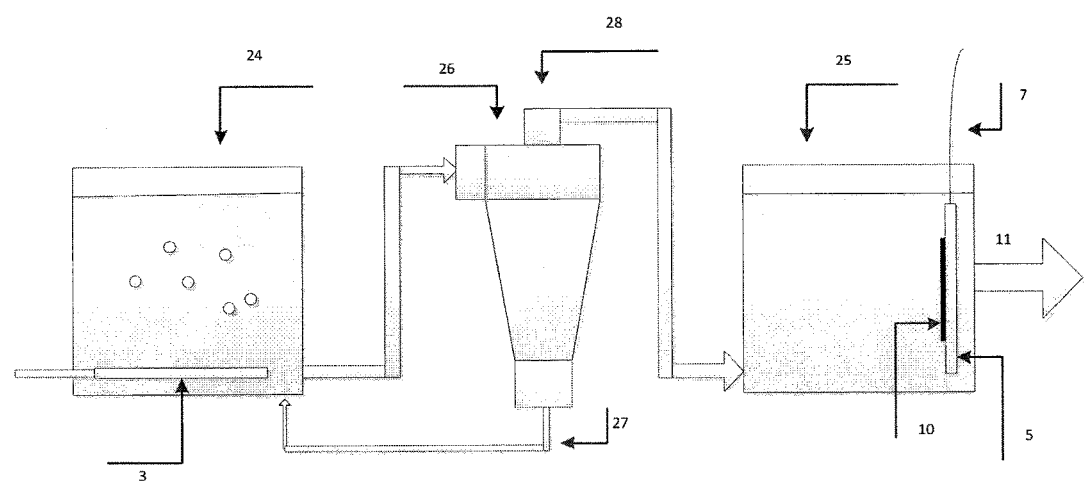
FIG. 4 shows in a schematically manner a further implementation according to the present invention, FIG. 5 indicates three different modes of operation with respect to biomass separation and filtration.

With reference to FIG. 4 a further implementation of the invention is disclosed. Waste water is introduced into the compartment 24 comprising activated sludge. In this implementation, the system comprising a pre-filtering means 26, e.g. in form of a cyclone separator 26. Activated sludge after being aerated by aeration device 3 and the biodegradation has taken place in the compartment 24 is fed to the cyclone separator 26. In this cyclone separation activated sludge flocs and thereby bacteria as well as solid matter of a certain density or size are separated off and leave the cyclone 26, as RAS, in the bottom of the cyclone 26 and is recirculated to the compartment 24 by connection 27. The remaining fluid, being activated sludge supernatant, leaves the cyclone at the upper outlet 28 and is fed into the compartment 25 in which a filter element 5 as disclosed above is arranged. The design of the filtration cake 10 and the filtering by the filtering element 5 are performed as outlined herein, typically by forming the filtration cake 10 by sludge or RAS.

The pre-filtering performed by 26 may advantageously be combined with the deflocculation disclosed with reference to FIG. 6 (see below). However, care should be taken to assure suitable conditions for re-flocculation to occur. This could include a re-flocculation chamber arranged e.g. upstream of the pre-filtering means.

Furthermore, the physical borders between three compartments disclosed in FIGS. 6 and 4 (the cyclone is referred to as a chamber) may be removed by embodying the chambers as flow regimes in one compartment.

Figure 5A:
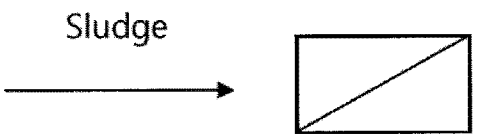
Figure 5A:
Figure 5B:
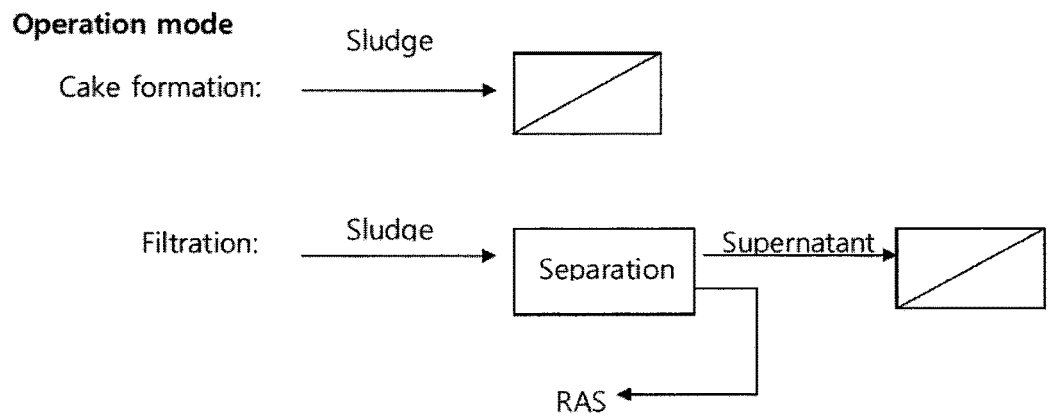
Figure 5C:
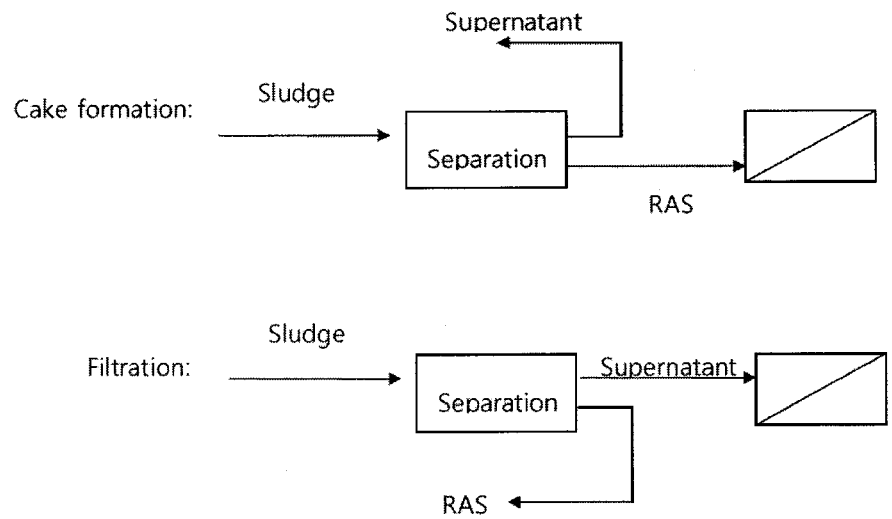

FIGS. 5A, B and C indicate three different operation modes of preferred embodiments of the invention. In FIG. 5, a filter is indicated by a box with a line connecting two corners as used ordinary to a skilled person, and the filtration cake 10 is preferably provided solely by activated sludge flocs present either in RAS (from e.g. a cyclone) or sludge. FIGS. 5B and 5C further comprising means for separating out flocs and/or other solid elements contained in the sludge before the activated sludge supernatant is displaced through the filtration cake 10.

FIG. 5A indicates an operation mode 1 in which the formation of the filtration cake 10 is done by activated sludge. Filtration is performed by moving the mixed liquor activated sludge through the filtration cake 10 and filter element 5.

FIG. 5B indicates an operation mode 2 in which formation of the filtration cake is done via the mixed liquor activated sludge. Before filtration (stage C in FIG. 3), the sludge is separated into two fractions: one fraction containing the flocculated part of the sludge labelled RAS (Return Activated Sludge) and one fraction containing non-settling particles and treated water labelled activated sludge supernatant. For filtration, only activated sludge supernatant is moved through the filter element 5 and filtration cake 10, while RAS is moved back to the region in which biodegradation occurs.

FIG. 5C indicates an operation mode 3 in which sludge is separated into RAS and activated sludge supernatant and only RAS is moved to the filter element 5 for formation of the filter cake 10. Activated sludge supernatant is moved back to the region in which biodegradation occurs, or into a separate chamber (not shown). For filtration, only activated sludge supernatant is moved through the filter element 5 and filtration cake 10, while RAS is moved back to the region in which biodegradation occurs.

Figure 6A:
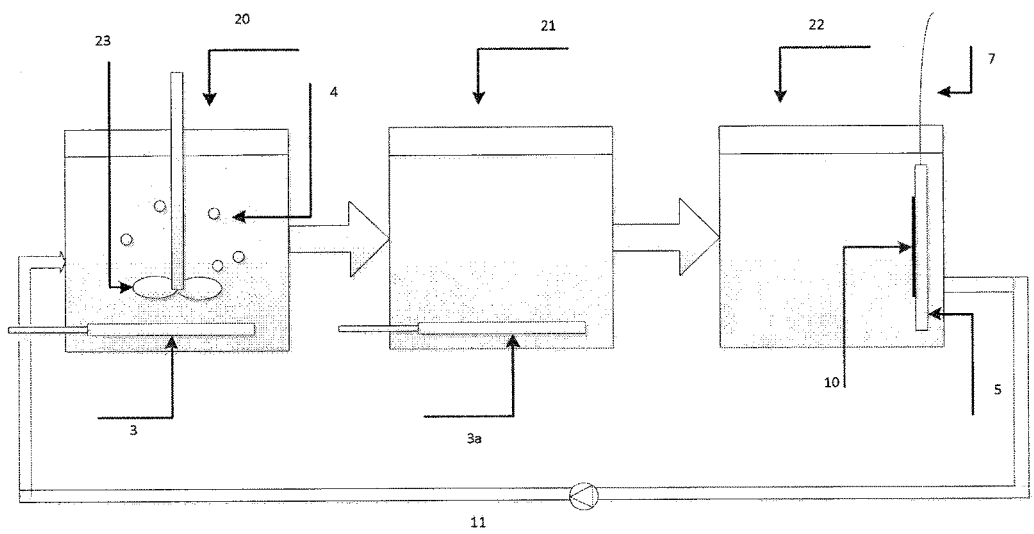
FIG. 6A shows in a schematically manner a further implementation according to the present invention, and FIG. 6B shown in a schematically flow chart, defloccu-lation of activated sludge, biodegradation of waste water components, reflocculation of activated sludge, and biomass separation and/or filtration.
Figure 6B:
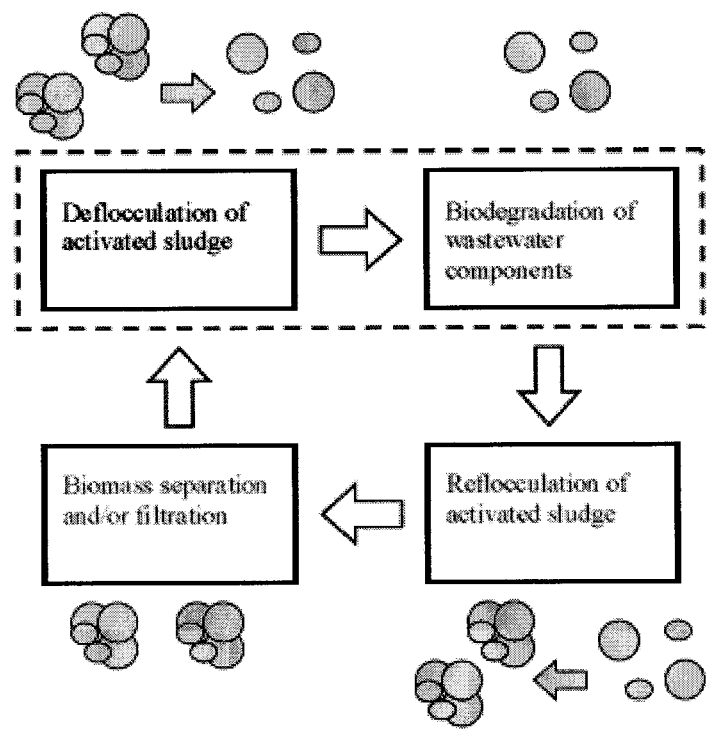

An optimised biodegradation may be performed according to the method disclosed in FIGS. 6A and 6B. While the optimised method disclosed can be implemented in the treatment process disclosed in relation to the foregoing figures, it has been found that the optimised method is applicable in other treatment processes employing activated sludge as well.

As indicated in FIG. 6A, the process resides in that a deflocculation promotes biodegradation due to increased surface area of particles and that a flocculation into larger flocs makes filtering more efficient. Accordingly, the treatment process may comprise the consecutive steps of
  deflocculating activated sludge flocs in the activated sludge prior to and/or during a biodegradation step
  performing a biodegradation of the biodegradable material in the waste water
  promoting re-flocculation of the de-floccutad flocs, and
  separating the flocs from the water
  It is noted that in a broad context, performing a biodegradation means allowing bacteria to perform the degradation. In addition, the step of deflocculation and biodegradation may be performed simultaneously.

With reference to FIG. 6A, the process comprises three steps, each representing a specific regime of the treatment. In FIG. 6A, the deflocculating takes place in a deflocculation compartment 20. Waste water is introduced into the compartment 20 comprising activated sludge, and in which a stirrer 23 is arranged for performing a mechanically-induced deflocculation of flocs present in the activated sludge by inducing shear forces into the fluid. Deflocculation may alternatively or in combination with the stirrer be provided by a pump, pumping the sludge into the compartment 20, as such pumps also introduce shear forces into the fluid, or by means of a nozzle. Air bubbles are introduced into the compartment by aeration device 3 to aerate the sludge.

After a certain residence time in the deflocculation compartment 20, the activated sludge is transferred into a re-flocculation compartment 21 where flocculation is promoted by seeking to avoid shear forces acting on the activated sludge flocs. The re-flocculation chamber 21 is a cavity in which the sludge is allowed a certain residence time sufficient for a flocculation to occur where the sludge is not acted upon in a manner that could result in a deflocculation. This flocculation may take place driven purely by the natural interactions between liquid and the substances present therein, although some mixing may be induced to the fluid to increase the flocculation speed. In general, the flocculation may be effected by promoting aerobic activity of bacteria, e.g. by aeration and addition of some waste water or other substrate or by chemical flocculation, e.g. by dosing a flocculant. In order to promote flocculation, an aeration device 3a is present in the compartment 21, to introduce air bubbles, or in general air or oxygen, into the activated sludge. In addition, addition of substrate, such as waste water or synthetic carbon source, would preferably also be applied to promote flocculation.

Once the re-flocculation has been performed, the fluid is transferred to the filter compartment 22. This compartment comprises a filter element 5 (more than one filter element 5 can be applied), with outlet 7 as disclosed in relation to FIG. 1. The outlet 11 is connected to the compartment 20 to recirculate RAS (Return Activated Sludge) by use of a pump. In compartment 22, the activated flocs are filtered off by the filter element 5 and the remaining fluid leaves the compartment through outlet 11. The design of the filtration cake 10 and the filtering by the filtering element 5 are performed as outlined herein. However, the adjustment of the state of biomass flocculation may be combined not only with biomass retention by filtration, but also adapted for use in the conventional activated sludge process (CASP), relying on biomass settling in settling tanks.

FIG. 6B shown in a schematically flow chart, deflocculation of activated sludge, biodegradation of waste water components, reflocculation of activated sludge, and biomass separation and/or filtration as disclosed in connection with FIG. 6A. The size of the flocs in the various steps are also schematically represented in FIG. 6B above or below the step in question. The dotted frame encircling deflocculation and biodegradation is a reference to the compartment 20 as disclosed in connection with FIG. 6A, and means that biodegradation and deflocculation of biomass may be combined in one compartment.

Experimental Results

In the following, results obtained by a device as shown in FIG. 1 are presented. The results are obtained by feeding various samples into the compartment 9.

The process parameters where
Pressure during accumulation phase A: 0.01—0.1 bar
Pressure during compression phase B: above pressure during accumulation phase and below 1 bar
Pressure during filtration phase C: lower than pressure during phase B, but typically up to 1 bar Filtration cake height was from 0 to 10 mm during accumulation phase A. After compression (phase B) the height was typically 1-4 (up to 10 mm).

| Sample | Suspended solids concentration [mg/L] |
|---|---|
| Raw sludge supernatant | 34 |
| Supernatant filtered through a coffee filter alone | 15 |
| Supernatant filtered through a cake built on a coffee filter and compressed at 10 kPa | 4 |
| Supernatant filtered through a cake built on a coffee filter and compressed at 15 kPa | 2 |
| Supernatant filtered through a cake built on a coffee filter and compressed at 20 kPa | 0 |
| Supernatant filtered through a membrane (pore size 0.45 micron, comparable example) | 1 |

The conclusions are that:
the majority of rejection with respect to suspended solids comes from the filtration cake
the quality of filtrate with respect to suspended solids, produced by the filtration cake, is comparable or exceeding that produced with a membrane
the quality of filtrate increasing with pressure level during stage B indicates the adjustable selectivity of filtration cake, which is an advantage of this approach Although the present invention has been described in connection with the specified embodiments, it should not be construed as being in any way limited to the presented examples. The scope of the present invention is set out by the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. A method for providing a filtration cake of a filter element for filtering an activated sludge supernatant through the filtration cake comprising:
an accumulation phase (A) comprising accumulating activated sludge flocs on a support structure by inducing a pressure difference to generate a flow of sludge, towards and through the support structure until a desired layer of flocs has been established on the support structure, wherein the pressure difference during the accumulation phase (A) is constant over time or increased over time and the fluid flowing through the support structure is recirculated during the accumulation phase (A), and
a compression phase (B) comprising increasing the pressure difference to a level being sufficient to compress the layer of accumulated flocs on the support structure into a filtration cake of desired properties, wherein the compression phase is performed subsequent to the accumulation phase, wherein the filtration cake is provided solely by flocs present in the activated sludge, and the pressure increase initiating the compression phase (B) is a step-wise increase.

2. The method according to claim 1, further comprising determining, by measuring and/or calculating one or more parameters of turbidity, suspended solids concentration, total bacteria count, total organic carbon concentration, or chemical oxygen demand (COD) of the fluid after having passed through the support structure during the accumulation phase (A) and the compression phase (B) when a pre-defined criteria involving a measured and/or calculated parameters has been met.

3. The method according to claim 1, wherein the pressure difference during the accumulation phase (A) is below 1 bar and the pressure difference during the compression phase (B) is above the pressure difference of the accumulation phase (A) and below 2 bar.

4. The method according to claim 1, wherein the pressure difference during the accumulation phase (A) and/or the compression phase (B) is/are provided by a hydrostatic pressure difference by pressurizing the sludge and/or providing suction.

5. The method according to claim 1, wherein the pressure difference during the accumulation phase (A) and/or the pressure difference during the compression phase (B) is/are provided by a pump arranged in or downstream of an outlet of the filter element.

6. The method according to claim 1, wherein the support structure is cylindrically shaped, and the method comprises feeding sludge to the support structure and rotating the support structure to provide centrifugal forces, which move flocs in the sludge toward the support structure.

7. The method according to claim 6, wherein the accumulation phase (A) and the compression phase (B) comprise rotating the support structure at two different rotational speeds, wherein the rotational speed during the compression phase (B) is higher than the rotation speed during the accumulation phase (A).

8. The method according to claim 1, wherein the surface of the filtration cake is trimmed by a mechanical manipulation of the filtration cake.

9. The method according to claim 1, wherein the filtration cake is provided by flocs present in the activated sludge and coagulated substances provided by adding a coagulant to the sludge.

10. The method according to claim 1, further comprising arranging a backing layer on the support structure so that the filtration cake forms on the surface of the backing layer, wherein the backing layer is fixed or disposable.

11. The method according to claim 1, wherein the filter after having been in an operation mode (C) for a period, is renewed by removing the filtration cake by scraping or cleaning, and the accumulation phase (A) and compression phase (B) are carried out again.

* * * * *